Patented Dec. 6, 1949

2,490,437

UNITED STATES PATENT OFFICE 2,490,437

DDT IN PETROLEUM SOLVENT STABILIZED WITH LANOLIN AND DIMERIZED EIGHTEEN CARBON ATOM FATTY ACIDS

John C. Hillyer, Bartlesville, Okla., assignor to Phillips Petroleum Company, a corporation of Delaware No Drawing. Application March 10, 1947, Serial No. 733,731

7 Claims. (Cl. 167—30)

This invention relates to stabilized, concentrated solutions of DDT [2,2-bis (parachlorophenyl)-1,1,1-trichloroethane] and to methods and materials for their preparation. In one particular aspect it relates to methods for preventing the separation of insoluble precipitates from concentrated solutions of DDT under low temperature conditions.

The term DDT in general commercial usage and as used in this specification refers to the chemical compound 2,2-bis (parachlorophenyl)-1,1,1-trichloroethane. This compound is well known to be highly effective as an insecticide. It is described in U. S. Patent No. 2,329,074 to Muller, reissued as Reissue No. 22,700. Muller discloses the use of DDT in solution in alcohol, petroleum or similar solvents or in aqueous emulsion. He suggests solutions or emulsions containing about 5 per cent DDT. Siegler, in U. S. Patent 2,358,942 teaches the use of water or other compatible liquid in the preparation of emulsions of DDT having low concentration. It has become common practice to employ emulsions or solutions containing DDT in low concentration as insecticides.

The advantages of concentrated solutions for purposes of storage and transportation are obvious. Since the solvents necessary for dilution or emulsification prior to use are usually obtainable at the location of use at low cost it has become common commercial practice to manufacture DDT solutions having high concentration and to dilute such concentrates prior to use. Petroleum solvents are commonly used in the preparation of these concentrates. Almost any desired cut of petroleum products could be used as a solvent for DDT but those composed chiefly of paraffins are less desirable as the solubility of DDT is comparatively low in these materials. Fractions containing cyclics and aromatics are preferred, since DDT is more soluble therein.

One preferred solvent for preparing concentrated DDT solutions is a petroleum fraction known as gas oil and further characterized by boiling in the range from about 385° F. to about 550° F., having a flash point of not less than 125° F. and having an aniline point of not more than 25° F. Solutions containing from 25 to 30 per cent by weight of DDT are easily prepared by the use of such gas oil at ordinary room temperatures of about 60° to 80° F.

The solubility of DDT in petroleum solvents, as would be expected, becomes less as the temperature decreases. A serious disadvantage of concentrated DDT solutions arises from this fact, since low temperatures such as are often encountered in freight transportation in the winter or in storage in unheated warehouses often decrease the solubility of DDT enough to cause a considerable proportion thereof to precipitate from solution and such precipitated DDT does not readily dissolve again when the mixture is warmed to normal room temperatures. The observed phenomenon of precipitation of DDT in excess of the quantity required to form a saturated solution at low temperature is peculiar and distinctive in that a large quantity is not precipitated as soon as the saturation temperature is passed, or even after "seeding" by initial crystal formation occurs, but the precipitation is very slow and may continue over a great many hours. The reason why the resulting precipitate does not again dissolve upon warming the mixture to room temperature is not known, but is probably connected in some way with the slowness of its formation.

Whatever the cause may be, it is known that DDT does precipitate from concentrated solutions in petroleum solvents under the influence of cold and that the resulting precipitate is difficult to redissolve in the solvent. It is obvious that the insecticidal effect of a mixture of DDT solution and crystals will not be uniform and that crystals present therein may clog dispensing equipment such as spray nozzles. DDT solutions which are stable and which contain 25 to 30 per cent DDT are greatly desired in commerce. A method for maintaining DDT in solution at low temperatures or for causing precipitated DDT to be easily redissolved would be a great advance in the art.

It is an object of my invention to provide solutions of DDT in petroleum solvents which are stabilized against precipitation of DDT at low temperatures.

Another object is to provide additives for concentrated solutions of DDT in petroleum solvents which stabilize such solutions against precipitation of DDT at low temperatures.

Another object is to provide a method for decreasing precipitation of DDT from solution in petroleum solvents at low temperatures.

Another object is to provide a method for causing crystals of DDT, formed from solution in a petroleum solvent, to be easily soluble in said solvent.

Other objects and advantages will become apparent to those skilled in the art as this disclosure proceeds.

I have discovered that the addition of a minor proportion of a material selected from the group of fats and fatty acids, consisting of lanolin, dimerized mixed $C_{18}$ fatty acids, and mixtures thereof, to a solution of DDT in a petroleum solvent results in a solution that is stabilized against precipitation of DDT at low temperatures—that is, the length of time such solution may be subjected to temperatures low enough to cause it to be supersaturated without separation of DDT crystals is greatly increased. When such crystals finally separate they are formed in small quantity only, remain suspended in the solution and quickly redissolve when the mixture is warmed to ordinary room temperatures, or about 70° F. Suitable dimerized mixed $C_{18}$ fatty acids may be produced as discussed by Cowan et al. in "Synthetic oils from residual dimerized fat acids," Oil and Soap, August 1943, page 153 et seq., and are also marketed under the trade-mark "Neo-Fat C–90" by Armour and Company, Chicago, Illinois.

No special procedures are necessary for preparing such solutions. Any method which results in a solution of DDT containing 0.5 to 1.0 per cent by weight of lanolin or dimerized $C_{18}$ fatty acids is satisfactory.

The mechanism by which these materials stabilize supersaturated solutions of DDT is unknown, but this property is exhibited by very few substances. Such materials as gelatin, casein, purified rosin, beeswax, acryloid resin, stearic acid, oleic acid, palmitic acid, lower fatty acids, HF soluble oil, "Paraflow" and "Santopour" do not inhibit the separation of heavy insoluble precipitates from such solutions in a relatively short time. More than 1 per cent of lanolin or mixed dimerized $C_{18}$ fatty acids may be used if desired but very little advantage is gained by increasing the proportion of these above 1 per cent. My invention is operable with proportions of additive varying from 0.5 per cent up to saturation of the solution therewith.

The following examples are given in order to illustrate the advantages gained in two embodiments of my invention. My invention, however, is not to be considered as limited to the particular petroleum solvent shown therein, nor to the concentration of DDT in the solutions of these examples, nor to the concentration of lanolin or fatty acids shown therein, but it is limited only by the scope of the attached claims.

*Example I*

Solutions were prepared containing 30 weight per cent of technical grade DDT in a gas oil having the following specifications:

| | |
|---|---|
| Boiling range, °F | 414–512 |
| Flash point, °F | 193 |
| Kauri-butanol No | 107.6 |
| Aniline No., °F | 14.2 |
| Refractive index, 20° C | 1.5376 |
| API gravity, 60° F | 20.2 |
| Color (NPA) | 1½ |

A 10 cc. sample of such solution was placed in a ⅝" diameter glass test tube, lightly corked, and the test tube was suspended in a water-glycol bath maintained at —10° F. ±1° F. A motor driven stirrer caused some vibration in the sample and the test tube was picked up for observation at intervals, causing the solution to be tipped back and forth in the tube. There was no other agitation while in the bath. This sample was clear when prepared at room temperature and remained clear for approximately 15 hours at —10° F. At the end of 16 hours at —10° F. a trace of crystalline material appeared. The quantity of crystalline material increased very slowly until approximately ½" of material had accumulated in the bottom of the test tube at the end of 88 hours. At the end of 160 hours at —10° F. crystalline material filled the entire volume occupied by the solution, and it was impossible to pour off the remaining solution. Since this crystalline material did not readily dissolve again when the mixture was warmed to room temperature it was evident that the usefulness of the solution had been greatly impaired.

*Example II*

To a 30 per cent DDT solution, prepared as in Example I, was added 1.0 per cent by weight of lanolin. A 10 cc. sample of the resulting solution was placed in a ⅝" test tube and was maintained at —10° F. in the manner described in Example I. After this sample had remained at —10° F. for 64 hours a trace of fine crystals in suspension was noticeable. A trace of crystalline material had settled to the bottom of the tube at the end of 88 hours and at the end of 160 hours this had increased to ¼" in the bottom of the test tube. These crystals readily redissolved when the solution was warmed to room temperature.

*Example III*

To a 30 per cent DDT solution, prepared as shown in Example I was added 1.0 per cent by weight of dimerized mixed $C_{18}$ fatty acids, marketed under the trade-mark "Neo-Fat C-90" by Armour and Company, Chicago, Illinois. A 10 cc. sample of the resulting solution was placed in a ⅝" test tube and was maintained at —10° F. in the manner described in Example I. After this sample had remained at —10° F. for 64 hours a trace of fine crystals in suspension was observed. A trace of crystalline material had settled to the bottom of the test tube at the end of 88 hours and this quantity slowly increased until at the end of 160 hours the crystalline material filled the lower ½" of the test tube. These crystals easily redissolved when the solution was again warmed to room temperature.

The stabilizing materials of my invention are cheap and readily available. The addition of these materials to solutions of DDT in a petroleum solvent causes the solutions of remain clear and stable for 60 hours or longer. The fine crystalline suspension which then forms is non-deleterious to the use of such insecticide solutions as it readily redissolves when the solution is warmed to room temperature. For practical purposes, therefore, these solutions are stable during transportation and storage at temperatures as low as —10° F. for periods of 100 hours or longer. At temperatures somewhat above —10° F. the period of stability is greatly extended. The concentrated solutions of DDT available heretofore, as illustrated in Example I, are not satisfactory for use in northern climates as such solution may be permanently injured by being subjected to low temperatures for a period of one day or more.

I claim:

1. An insecticide solution comprising from 25 to 30 weight per cent of DDT, from 0.5 to 1.0 weight per cent of a mixture of lanolin and dimerized mixed $C_{18}$ fatty acids, and a petroleum solvent boiling in the range from 385° F. to 550° F., having a flash point of not less than 125° F. and an aniline point of not more than 25° F.

2. An insecticide solution comprising 30 weight per cent of DDT, one per cent by weight of dimerized mixed $C_{18}$ fatty acids, and a petroleum solvent characterized by boiling in the range from 414° F. to 512° F., having a flash point of 193° F., a kauri-butanol number of 107.6, an aniline No. of 14.2° F., a refractive index at 20° C. of 1.5376, an A. P. I. gravity at 60° F. of 20.2, and a color (NPA) of 1½, said insecticide solution being more stable to precipitation of DDT therefrom at a temperature of −10° F. than a corresponding insecticide solution consisting of the same amount of DDT dissolved in the same petroleum solvent.

3. A solution of DDT and a petroleum solvent containing sufficient DDT to be supersaturated at −10° F. and also containing dissolved therein at least 0.5 weight per cent of a mixture of lanolin and mixtures of dimerized $C_{18}$ fatty acids.

4. An insecticide solution comprising from 25 to 30 weight per cent of DDT, from 0.5 to 1.0 weight per cent of lanolin, and a petroleum solvent boiling in the range from 385° F. to 550° F., having a flash point of not less than 125° F. and an aniline point of not more than 25° F.

5. An insecticide solution comprising from 25 to 30 weight per cent of DDT, from 0.5 to 1.0 weight per cent of dimerized mixed $C_{18}$ fatty acids, and a petroleum solvent boiling in the range from 385° F. to 550° F., having a flash point of not less than 125° F. and an aniline point of not more than 25° F.

6. A solution of DDT and a petroleum solvent containing sufficient DDT to be supersaturated at −10° F. and also containing dissolved therein at least 0.5 weight per cent of dimerized mixed $C_{18}$ fatty acids.

7. A solution of DDT and a petroleum solvent containing sufficient DDT to be supersaturated at −10° F. and also containing dissolved therein at least 0.5 weight per cent of lanolin.

JOHN C. HILLYER.

REFERENCES CITED

The following references are of record in the file of this patent:

UNITED STATES PATENTS

| Number | Name | Date |
|---|---|---|
| 2,096,885 | Donlan | Oct. 26, 1937 |
| 2,134,136 | Lindstaedt | Oct. 25, 1938 |
| 2,160,572 | Eichwald | May 30, 1939 |
| 2,365,919 | Ulath et al. | Dec. 26, 1944 |

OTHER REFERENCES

Jones et al.: J. Econ. Ent., April 1945, page 209. (Copy in Division 43.)

Fleck et al.: Industrial and Eng. Chem., Feb. 1946, pages 177–188. (Copy in Pat. Off. Scientific Library.)

Pests, April 1946, page 5. (Copy in Division 43.)

Cowan et al.: Oil and Soap, Aug. 1943, page 153. (Copy in Patent Office Scientific Library.)